(12) United States Patent
Dupart et al.

(10) Patent No.: US 11,055,393 B2
(45) Date of Patent: Jul. 6, 2021

(54) SECURE ACCESS CONTROL METHOD WITH SHORT RANGE AND MEDIUM OR LONG-RANGE MODES OF OPERATION

(71) Applicant: SYSTEMES ET TECHNOLOGIES IDENTIFICATION (STID), Greasque (FR)

(72) Inventors: Vincent Dupart, Saint-Maximin-la-Sainte-Beaume (FR); Jerome Silve, Rousset (FR); Sylvain Poitrat, Greasque (FR)

(73) Assignee: SYSTEMES ET TECHNOLOGIES IDENTIFICATION, Greasque (FR)

( * ) Notice: Subject to any disclaimer, the term of this patent is extended or adjusted under 35 U.S.C. 154(b) by 0 days.

(21) Appl. No.: 16/386,975

(22) Filed: Apr. 17, 2019

(65) Prior Publication Data
US 2019/0318075 A1    Oct. 17, 2019

(30) Foreign Application Priority Data

Apr. 17, 2018   (FR) ...................................... 18/53355

(51) Int. Cl.
*G06F 21/35*   (2013.01)
*G07C 9/22*    (2020.01)
(Continued)

(52) U.S. Cl.
CPC .............. *G06F 21/35* (2013.01); *G07C 9/22* (2020.01); *H04W 4/80* (2018.02); *H04W 12/06* (2013.01)

(58) Field of Classification Search
CPC ....... G06F 21/35; G07C 9/00031; G07C 9/22; H04W 12/06; H04W 4/80; G06K 7/10356; G06K 19/0724; G06K 19/0719
(Continued)

(56) References Cited

U.S. PATENT DOCUMENTS

| 9,762,581 B1 * | 9/2017 | Wang ...................... H04L 63/10 |
| 2016/0267729 A1 * | 9/2016 | Baumgarte ........... H04W 12/06 |

(Continued)

FOREIGN PATENT DOCUMENTS

| CN | 103561480 | 2/2014 |
| EP | 2833653 | 2/2015 |

(Continued)

*Primary Examiner* — Farid Seyedvosoghi
(74) *Attorney, Agent, or Firm* — Burris Law, PLLC

(57) ABSTRACT

A secure access control method uses a reader and a radio-communication mobile terminal. The reader includes a first radiocommunication module having a first range and a second radiocommunication module having a second range less than the first range. The mobile terminal includes a first radiocommunication chip that establishes a first radiocommunication channel with the first radiocommunication module and a second radiocommunication chip that establishes a second radiocommunication channel with the second radiocommunication module. The method implements two modes of operation. In the first mode, when the mobile terminal is at a distance from the reader less than the first range and greater than the second range, the first radiocommunication channel is established. In the second mode, when the mobile terminal is at a distance from the reader less than the second range, the second radiocommunication channel is established as a priority.

16 Claims, 2 Drawing Sheets

(51) Int. Cl.
*H04W 4/80* (2018.01)
*H04W 12/06* (2021.01)

(58) Field of Classification Search
USPC .......................................................... 455/411
See application file for complete search history.

(56) References Cited

U.S. PATENT DOCUMENTS

2017/0150349 A1* 5/2017 Huh ...................... H04W 12/04
2019/0073468 A1* 3/2019 Kazerani ................. G06F 21/35

FOREIGN PATENT DOCUMENTS

KR        20170121645       11/2017
WO         2016198780       12/2016

* cited by examiner

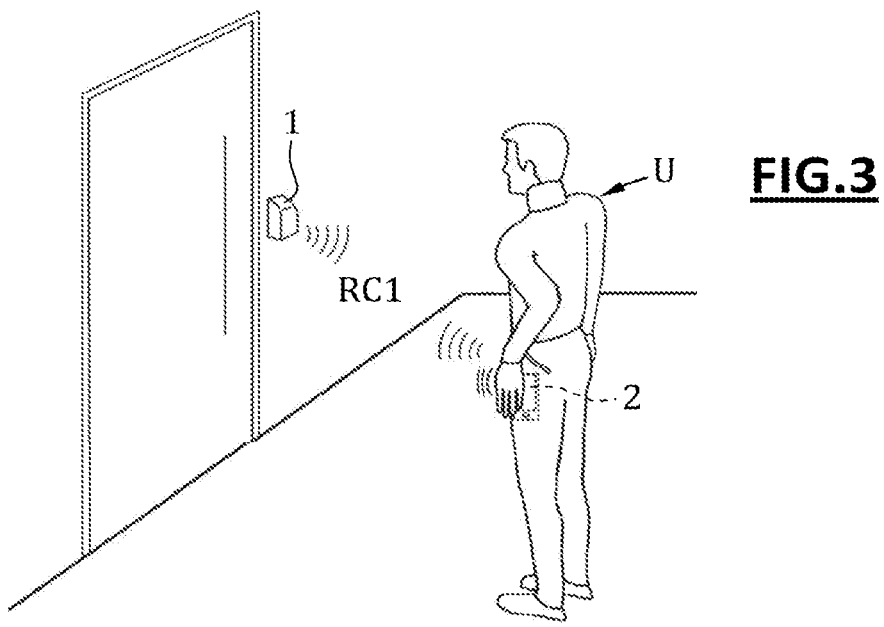
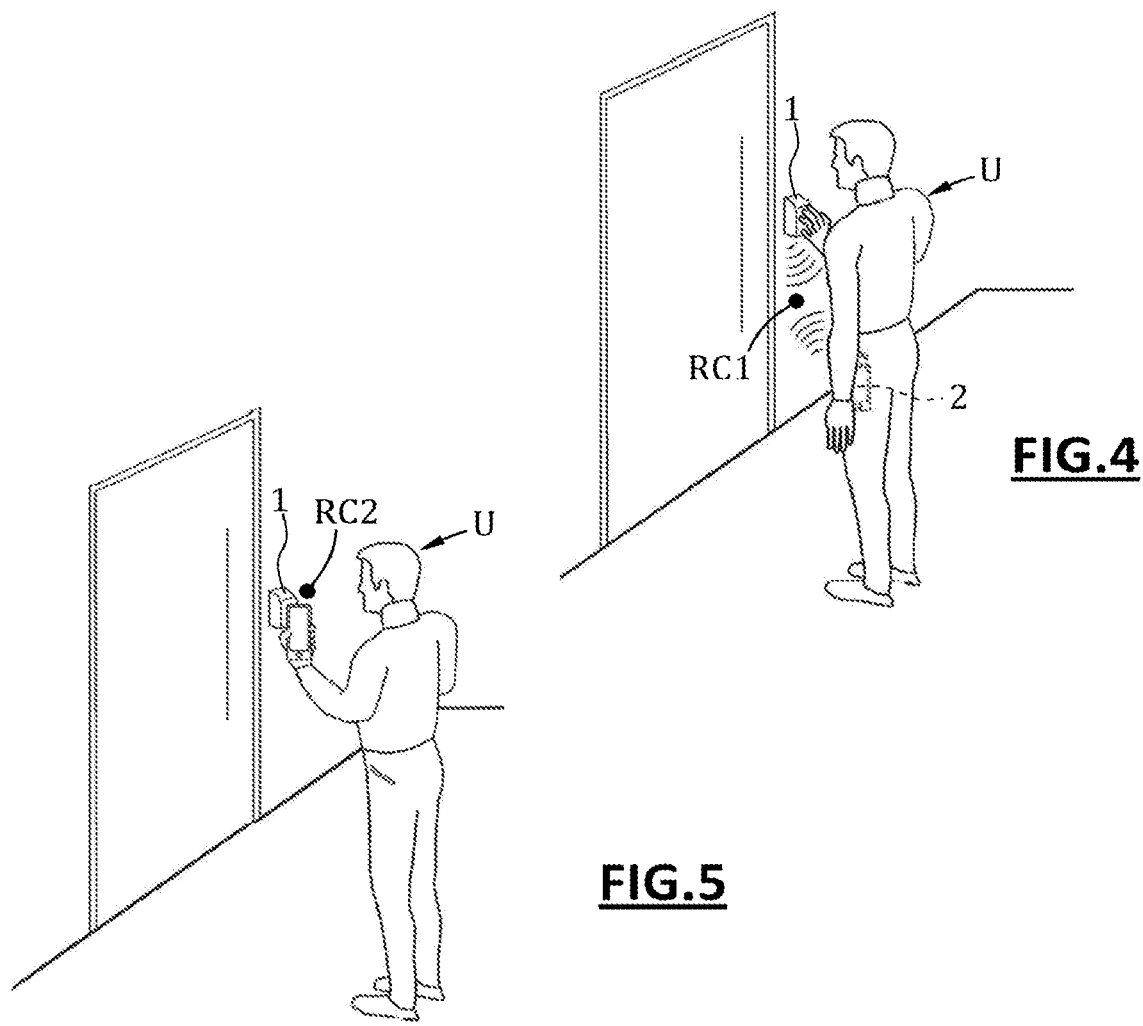

SECURE ACCESS CONTROL METHOD WITH SHORT RANGE AND MEDIUM OR LONG-RANGE MODES OF OPERATION

CROSS-REFERENCE TO RELATED APPLICATIONS

This application claims priority to and the benefit of FR 18/53355, filed on Apr. 17, 2018. The disclosure of the above application is incorporated herein by reference.

FIELD

The present disclosure relates to a secure access control method.

BACKGROUND

The statements in this section merely provide background information related to the present disclosure and may not constitute prior art.

In the field of access control, it is known to use secure access control readers comprising an active radio frequency identification chip in order to allow contactless and short-distance access control according to the RFID technology, generally by means of badges provided with a passive radio frequency identification chip.

It is also known to use, instead of such badges, mobile terminals of the phone terminal (or smartphone) type implementing a secure radiocommunication with the secure access control reader according to a medium or long-range wireless communication protocol of the BLUETOOTH® type.

However, the range of such radiocommunication between the phone terminal and the access control reader has a major disadvantage when several access control readers are located within the phone terminal field of range, with risks of conflict raising security breaches.

To overcome this disadvantage, it has been proposed in document WO 2016/198780 A1 to use a secure access control method implementing an evaluation of the receiving power (or RSSI for "Received Signal Strength Indication") during such a medium or long-range wireless communication.

Although advantageous, this method has a first disadvantage which is that, if the phone terminal is close to the reader, there are issues related to different models of phone terminals integrating different types of medium or long-range radiocommunication chips in particular BLUETOOTH®, so that the management of the receiving power thresholds is complex and can create unwanted operations.

Another disadvantage is the latency times related to the medium or long-range wireless communication protocols, in particular the BLUETOOTH® type. If these latency times are not penalizing at a medium and long distance (because the time of approach of the phone terminal towards the reader allows covering this latency), they are however damaging at a short distance, that is to say below 1 meter.

SUMMARY

The present disclosure provides a secure access control method adapted for secure radiocommunications and which is reliable and fast both at a medium distance and short distance.

The present disclosure further provides a secure access control method adapted to different models of mobile terminals or phone terminals, and particularly to different types of medium or long-range radiocommunication chips, in particular the BLUETOOTH® type.

To this end, the present disclosure proposes a secure access control method using:

a reader, of the secure access control reader type, comprising a control module in connection with a remote processing unit, and further comprising a first radiocommunication module having a first range and a second radiocommunication module having a second range less than the first range; and at least one radiocommunication mobile terminal carried by a user, wherein this mobile terminal comprises:

a first radiocommunication chip capable of establishing a first radiocommunication channel with the first radiocommunication module of the reader if said mobile terminal is located at a distance from the reader less than the first range; and a second radiocommunication chip capable of establishing a second radiocommunication channel with the second radiocommunication module if said mobile terminal is located at a distance from the reader less than the second range.

The secure access control method comprises an authentication phase during which the mobile terminal communicates to the control module of the reader authenticated identification data specific to the mobile terminal and towards the remote processing unit.

The secure access control method implements at least two modes of operation:

a first mode of operation in which the mobile terminal is located at a distance from the reader less than the first range and greater than the second range, and in which the first radiocommunication chip of the mobile terminal establishes a radiocommunication in the first radiocommunication channel with the first radiocommunication module of the reader in order to exchange identification data in this first radiocommunication channel between the mobile terminal and the control module of the reader during or subsequently to the authentication phase; and a second mode of operation in which the mobile terminal is located at a distance from the reader less than the second range, and in which the second radiocommunication chip of the mobile terminal establishes as a priority and automatically a radiocommunication in the second radiocommunication channel with the second radiocommunication module of the reader in order to exchange identification data in this second radiocommunication channel between the mobile terminal and the control module of the reader during or subsequently to the authentication phase, where this second radiocommunication channel is selected automatically and as a matter of priority by the mobile terminal for this radiocommunication over the first radiocommunication channel.

In this way, at a short distance, the second mode of operation takes precedence over the first mode of operation, in other words the second radiocommunication channel has priority over the first radiocommunication channel, so that the disadvantages of the first radiocommunication channel (latency, variable receiving power thresholds) do not need to be managed at a short distance, while maintaining this first medium or long-distance radiocommunication channel in the first mode of operation.

It should be noted that the first range of the first radiocommunication module corresponds to the maximum distance beyond which the first radiocommunication chip of the mobile terminal cannot establish the first radiocommunication channel. Likewise, the second range of the second radiocommunication module corresponds to the maximum distance beyond which the second radiocommunication chip of the mobile terminal cannot establish the second radiocommunication channel.

In the context of the present disclosure, there are therefore three possibilities depending on the distance between the reader and the mobile terminal:

if the distance is greater than the first range (highest range), then it is not possible to establish the first radiocommunication channel and the second radiocommunication channel;

if the distance is greater than the second range (lowest range) and less than or equal to the first range, then the first radiocommunication channel is established as part of the first mode of operation, and it is not it is possible to establish the second radiocommunication channel because the distance is too great; and if the distance is less than or equal to the second range, then it is possible to establish the first radiocommunication channel and also the second radiocommunication channel, however the second radiocommunication channel is established as a matter of priority as part of the second mode of operation.

According to one characteristic, in the first mode of operation, the first radiocommunication chip of the mobile terminal establishes the radiocommunication in the first radiocommunication channel with the first radiocommunication module of the reader on the condition that the user has previously performed an action of access on the mobile terminal or on the reader, this action of access waking up the first radiocommunication chip of the mobile terminal or the first radiocommunication module of the reader in order to initiate communication in said first radiocommunication channel.

In a first form, an action of access corresponds to an approach, with or without contact, of the user, in particular of a hand of the user, in the proximity of a presence detection system integrated into the reader, this approach waking up the first radiocommunication module of the reader in order to initiate communication in the first radiocommunication channel.

Advantageously, the presence detection system corresponds to a capacitive sensor integrated into the reader.

In a second form, an action of access corresponds to an action on the mobile terminal waking up the first radiocommunication chip of the mobile terminal in order to initiate communication in the first radiocommunication channel, said action on the mobile terminal being selected from at least one of the following actions:

a pressure maintained or in a predefined path, on a touch screen of the mobile terminal, in particular in a punctual manner;

a pressure on a button of the mobile terminal;

a predefined impact movement on the mobile terminal detected by an accelerometer integrated into the mobile terminal;

a predefined movement of displacement of the mobile terminal detected by an accelerometer integrated into the mobile terminal; and an action of unlocking the mobile terminal in order to make it exit a standby mode.

According to another characteristic, establishing communication in the second radiocommunication channel inhibits the communication in the first radiocommunication channel.

According to one possibility of the present disclosure, the first radiocommunication chip of the mobile terminal and the first radiocommunication module of the reader operate according to a medium or long-range wireless communication protocol with a first range greater than 1 meter, and in particular comprised between 1 and 30 meters.

In a particular form, the medium-distance wireless communication protocol is selected from one of the following types of protocols: BLUETOOTH®, WI-FI®, WIBREE, WIMAX®, LORA®, ZIGBEE®.

Of course, the present disclosure cannot be limited to its examples of medium or long-range wireless communication protocols.

According to another possibility of the present disclosure, the second radiocommunication chip of the mobile terminal and the second radiocommunication module of the reader operate according to a short-range wireless communication protocol with a second range of 50 centimeters at most, and in particular in the order of 1 to 15 centimeters.

In a particular form, the short-range wireless communication protocol is a near field communication protocol or NFC protocol.

In accordance with another characteristic of the present disclosure, the mobile terminal is a phone terminal, such as a smartphone.

Of course, the present disclosure cannot be limited to a phone terminal and can be considered with any type of mobile terminal meeting the aforementioned characteristics, and in particular a mobile terminal in the form of a key ring, or badge, or other communicating object.

The present disclosure also concerns the characteristic according to which the reader also comprises at least one complementary access control system selected from at least one of:

a biometric control device in order to allow a complementary access control by biometrics;

an image capture device in order to allow a complementary access control by facial recognition; and a keyboard in order to allow a complementary access control by entering a code.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3 illustrates an access action corresponding to an impact movement to establish a first mode of operation according to the present disclosure;

FIG. 4 illustrates an access action corresponding to presence detection of a user's hand to establish a second mode of operation according to the present disclosure; and FIG. 5 illustrates automatically establishing the second mode of operation as a priority according to the present disclosure.

Figure 1:
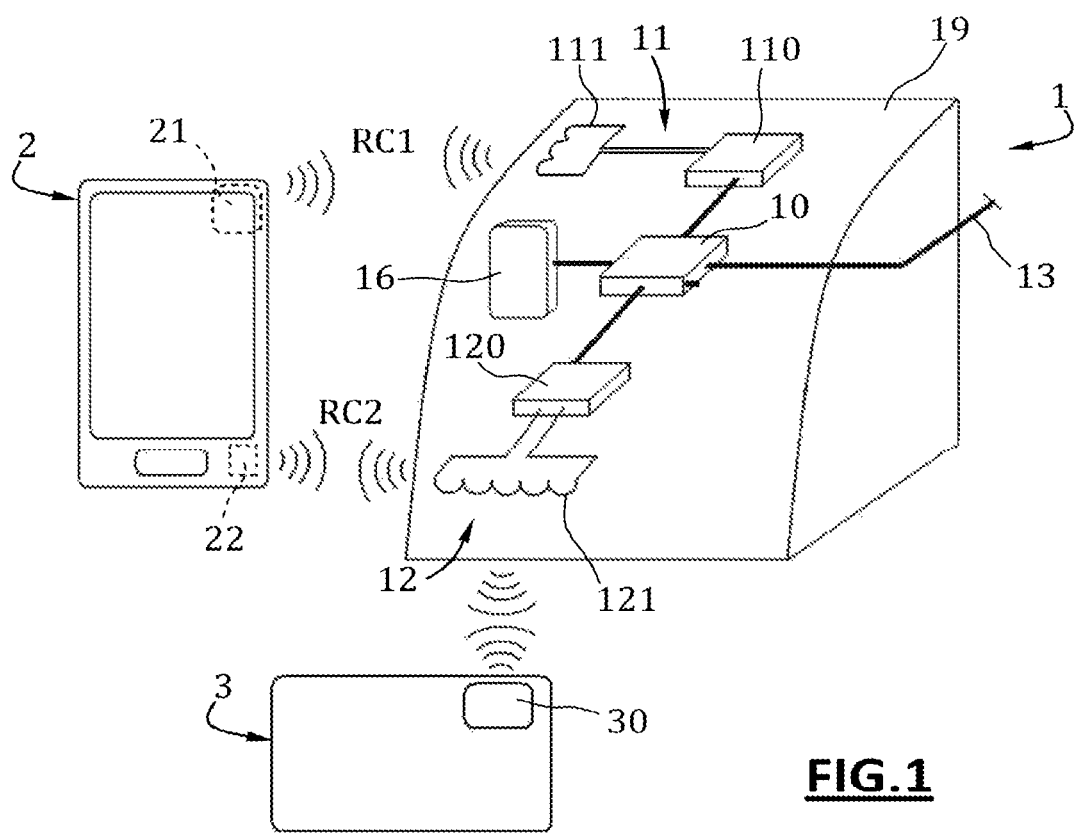
FIG. 1 is a schematic view of a reader and a mobile terminal adapted for implementing a secure access control method according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, the method in accordance with the present disclosure is implemented with at least one secure access control reader 1 and at least one radiocommunication mobile terminal 2 carried by a user.

The reader 1 comprises a casing 19 provided with means for fastening on a support (not illustrated), generally a vertical support such as a wall or a partition.

This reader 1 comprises, inside this casing 19:

a control module 10, in particular of the controller or processor type;

a first radiocommunication module 11 comprising a first radiocommunication chip 110 linked to an antenna 111 and connected to the control module 10; and a second radiocommunication module 12 comprising a second radiocommunication chip 120 linked to an antenna 121 and connected to the control module 10.

The control module 10 is in connection with a remote processing unit (not illustrated) via a connection which is:

either a wired connection by bus, by means of a communication cable 13, in order to allow the wired transmission (piloted by the control module 10) of identification data to the remote processing unit; or a non-wired connection by means of a wireless radiocommunication module associated with an antenna, in order to allow the wireless transmission (piloted by the control module 10) of identification data to the remote processing unit.

The reader 1 and its various internal electronic components can be electrically powered by mains-powered plugging and/or by means of a rechargeable or non-rechargeable electric battery.

The first radiocommunication module 11 has a first range which will be referred to as medium or long-range and which is greater than 1 meter, and which is in particular comprised between 1 and 30 meters.

This first radiocommunication module 11 operates according to one of the following medium or long-range wireless communication protocols, given as non-limiting examples: BLUETOOTH®, WI-FI®, WIBREE, WIMAX®, LORA®, ZIGBEE®.

The second radiocommunication module 12 has a second range which will be referred to as short-range, which is less than the first range, which is less than 50 centimeters by being in particular comprised between 1 and 15 centimeters.

This second radiocommunication module 12 operates according to a short-range wireless communication protocol of the near field communication protocol or NFC protocol type.

The reader 1 can also integrate, inside the casing 19, a presence detection system 16, in particular of the capacitive sensor type, connected to the control module 10.

The mobile terminal 2 is a phone terminal, of the smart phone type, but could also be, as non-limiting examples, a digital tablet or a personal digital assistant or an access badge or a key ring meeting the above-mentioned characteristics.

This mobile terminal 2 integrates, in addition to a battery and an electronic card or chip (not illustrated):

a first radiocommunication chip 21 linked to an antenna (not illustrated) and capable of establishing a first radiocommunication channel RC1 with the first radiocommunication module 11 of the reader 1 if the mobile terminal 2 is located at a distance from the reader 1 less than the first range; and a second radiocommunication chip 22 linked to an antenna (not illustrated) and capable of establishing a second radiocommunication channel RC2 with the second radiocommunication module 12 if said mobile terminal 2 is located at a distance from the reader 1 less than the second range.

The first radiocommunication chip 21 operates in the same technology or the same medium or long-range wireless communication protocol as the first radiocommunication module 11, namely, as non-limiting examples: BLUETOOTH®, WI-FI®, WIBREE, WIMAX®, LORA®, ZIGBEE®.

The second radiocommunication chip 22 operates in the same technology or the same short-range wireless communication protocol as the second radiocommunication module 12, namely in near field communication or NFC.

The secure access control method comprises an authentication phase during which the mobile terminal communicates identification data to the control module of the reader and at the end of which the control module 10 of the reader 1 transmits authenticated identification data specific to the mobile terminal 2 towards the remote processing unit.

This authentication phase may be of the simple or mutual authentication type.

By way of example, during simple authentication, the mobile terminal 2 and the near reader 1 enter into secure radiocommunication (either with a first radiocommunication RC1 or with a second radiocommunication RC2) and successively:

the reader 1 communicates its specific identifier (such as for example a serial number) to the mobile terminal 2;

the mobile terminal 2 calculates a signature from this identifier of the reader 1 and also from the identification data of the mobile terminal 2;

the mobile terminal 2 transmits its identification data as well as this signature to the reader 1; and the control module 10 of the reader 1 verifies with the signature the authenticity of the identification data, before transmitting authenticated identification data to the remote processing unit.

The control module 10 of the reader 1 can authenticate the identification data with the public key of a public/private key pair, this public key being stored in a memory, such as a secure memory, associated with the control module 10.

The processing unit will then recover these identification data for purposes of processing and decision of one or more actions, such as for example unlocking an access, launching an alert, actuating a home automation system, recording a history of transition information, etc.

Before starting such an authentication phase, the secure access control method operates according to either of the first mode of operation and the second mode of operation described hereinafter, depending on the distance between the mobile terminal 2 and the reader 1.

The first mode of operation, which corresponds to a medium or long-distance operation, is implemented when the mobile terminal 2 is located at a distance from the reader 1 less than the first range and greater than the second range, and in this case the first radiocommunication chip 21 of the mobile terminal 2 establishes a radiocommunication in the first radiocommunication channel RC1 with the first radiocommunication module 11 of the reader 1, thus establishing a radiocommunication between the reader 1 and the mobile terminal 2 in this first radiocommunication channel RC1 in order to exchange identification data during or subsequently to the authentication phase.

Figure 2:
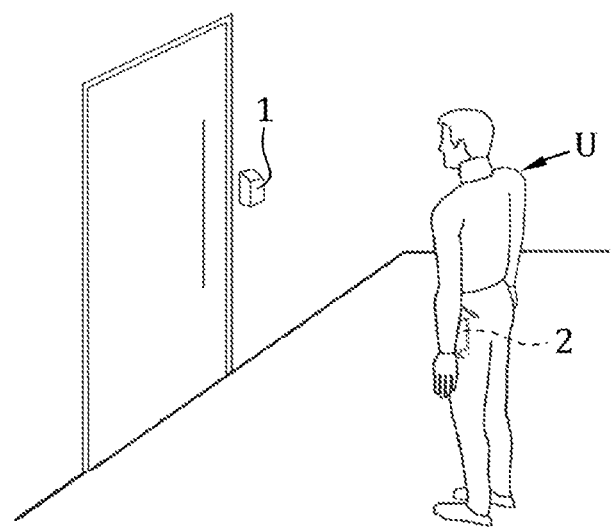
FIG. 2 illustrates a secure access control method according to the present disclosure.

In FIG. 2, the user U, and therefore the mobile terminal 2, are located at a distance from the reader 1 less than the first range and greater than the second range. However, the radiocommunication in the first radiocommunication channel RC1 is not yet established between the reader 1 and the mobile terminal 2.

Indeed, in the first mode of operation, the first radiocommunication chip 21 of the mobile terminal 2 establishes the radiocommunication in the first radiocommunication channel RC1 with the first radiocommunication module 11 of the reader 1 on the condition that the user U has previously performed an action of access on the mobile terminal 2 or on the reader 1, this action of access waking up the first radiocommunication chip 21 of the mobile terminal 2 or the first radiocommunication module 11 of the reader 1 in order to initiate this communication in the first radiocommunication channel RC1.

In the example of FIG. 3, the user U performs an action of access that corresponds to an action on the mobile terminal 2 waking up the first radiocommunication chip 21 of the mobile terminal 2 in order to initiate communication in the first radiocommunication channel RC1, where this action on the mobile terminal 2 corresponds to a predefined impact movement on the mobile terminal 2 detected by an accelerometer integrated into the mobile terminal 2, in other words a movement in which the mobile terminal 2 undergoes at least one impact or shock. In one example, the impact or shock has a low amplitude in order to avoid damaging the mobile terminal 2.

Regarding the type of impact movement, it may for example be a movement in which the user U applies a succession of at least two consecutive strokes on the mobile terminal 2.

As visible in FIG. 3, the mobile terminal 2 can remain in a garment pocket (or in a bag) during this impact movement. This impact movement can be detected although the mobile terminal 2 is in standby mode. The mobile terminal 2 reflects this detection of an impact or a succession of impacts by the accelerometer into an awakening of the first radiocommunication chip 21 capable of allowing to establish the communication in the first radiocommunication channel RC1.

In the example of FIG. 4, the user U has approached the reader 1, but the distance between the mobile terminal 2 and the reader 1 remains greater than the second range (in this case the mobile terminal 2 remains in a garment pocket or in a bag). In this example, the user U performs an action of access that corresponds to an approach, with or without contact, of a hand in the proximity of the reader 1 and more specifically the presence detection system 16, this approach detected by the presence detection system 16 waking up the first radiocommunication module 11 of the reader 1 in order to initiate communication in the first radiocommunication channel RC1.

As visible in FIG. 4, the mobile terminal 2 can remain in a garment pocket (or in a bag) during this approach movement of the hand. The control module 10 of the reader 1 reflects this detection of the approach or of the presence of the hand by the presence detection system 16, into an awakening of the first radiocommunication module 11 capable of allowing to establish the communication in the first radiocommunication channel RC1.

The second mode of operation, which corresponds to a short-distance operation, is implemented when the mobile terminal 2 is located at a distance from the reader 1 less than the second range, and in this case the second radiocommunication chip 22 of the mobile terminal 2 establishes as a priority and automatically a radiocommunication in the second radiocommunication channel RC2 with the second radiocommunication module 12 of the reader 1, thus establishing a radiocommunication between the reader 1 and the mobile terminal 2 in this second radiocommunication channel RC2 in order to exchange identification data during or subsequently to the authentication phase.

This second radiocommunication channel RC2 is therefore selected automatically and as a matter of priority by the mobile terminal 2 over the first radiocommunication channel RC1, to achieve the radiocommunication between the reader 1 and the mobile terminal 2 during or subsequently to the authentication phase, so that the establishment of the second radiocommunication channel RC2 inhibits the first radiocommunication channel RC1 and only the second radiocommunication channel RC2 is used so that the reader 1 and the mobile terminal 2 can exchange data and in particular identification data during or subsequently to the authentication phase.

In the example of FIG. 5, the user U has taken out his mobile terminal 2 from his garment pocket (or his bag) in order to place it on the reader 1, thus automatically establishing the second mode of operation, in other words the radiocommunication in the second radiocommunication channel RC2 which is a priority.

Of course, this second mode of operation is established if the mobile terminal 2 is equipped with a second radiocommunication chip 22 and if the second radiocommunication chip 22 is activated.

However, if the mobile terminal 2 is not equipped with a second radiocommunication chip 22, or if the mobile terminal 2 is equipped with a second radiocommunication chip 22 but this one is not activated, then the second mode of operation cannot be established and the method will implement the first mode of operation both at a short distance and at a medium or long distance.

As part of the method, it is possible that the second mode of operation is accessible:

manually because the user selects the second radiocommunication channel; or automatically to provide improved performance in distance and processing time.

It should be noted that the reader 1 can also allow a complementary access control according to the RFID technology by means of an access badge 3 provided with a passive radio frequency identification chip 30, where this passive radio frequency identification chip 30 will be detected by the antenna 121 of the second radiocommunication module 12.

As previously indicated, the reader 1 can also integrate at least one complementary access control system selected from the list comprising:

a biometric control device in order to allow a complementary access control by biometrics, in particular by fingerprint control, retina or iris;

an image capture device, such as a digital camera, in order to allow a complementary access control by facial recognition; and/or a keyboard in order to allow a complementary access control by entering a code.

Thus, another user, not holding a mobile terminal 2 adapted to implement the method previously described, can obtain access by means of such a complementary access control system.

In the example of FIG. 1, this other user may hold an access badge 3 provided with a passive RFID chip 30 which communicates with the active radio frequency identification chip 14 integrated into the reader 1, in order to obtain the access.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A secure access control method using a reader, of the secure access control reader type, and at least one radiocommunication mobile terminal carried by a user, the reader comprising a control module in connection with a remote processing unit, a first radiocommunication module having a first range and a second radiocommunication module having a second range less than the first range, said secure access control method comprising:
    establishing a first radiocommunication between the mobile terminal and the reader when the mobile terminal is located at a distance from the reader less than the first range and greater than the second range, wherein a first radiocommunication chip of the mobile terminal establishes the first radiocommunication in a first radiocommunication channel with the first radiocommunication module of the reader to exchange identification data by way of the first radiocommunication channel between the mobile terminal and the control module of the reader during or subsequently to an authentication phase; and
    establishing a second radiocommunication between the mobile terminal and the reader when the mobile terminal is located at a distance from the reader less than the second range, wherein a second radiocommunication chip of the mobile terminal establishes the second radiocommunication in a second radiocommunication channel with the second radiocommunication module of the reader to exchange identification data by way of the second radiocommunication channel between the mobile terminal and the control module of the reader during or subsequently to the authentication phase, wherein the second radiocommunication channel is selected automatically and as a priority over the first radiocommunication channel,
    wherein, during the authentication phase, the mobile terminal communicates authenticated identification data specific to said mobile terminal and towards the remote processing unit,
    wherein the first radiocommunication is initiated by an action of access on the mobile terminal or on the reader, which causes waking up of the first radiocommunication chip of the mobile terminal or the first radiocommunication module of the reader, the first radiocommunication being initiated before the second radiocommunication is initiated.

2. The secure access control method according to claim 1, wherein the action of access corresponds to an approach, with or without contact, of the user in proximity of a presence detection system integrated into the reader, said approach waking up the first radiocommunication module of the reader to initiate communication in the first radiocommunication channel.

3. The secure access control method according to claim 2, wherein the action of access corresponds to an approach, with or without contact, of a hand of the user in proximity of the presence detection system.

4. The secure access control method according to claim 2, wherein the presence detection system corresponds to a capacitive sensor integrated into the reader.

5. The secure access control method according to claim 1, wherein the action of access corresponds to an action on the mobile terminal waking up the first radiocommunication chip of the mobile terminal to initiate communication in the first radiocommunication channel, wherein the action on the mobile terminal is selected from at least one of:
    a pressure maintained or in a predefined path, on a touch screen of the mobile terminal;
    a pressure maintained or in a predefined path, in a punctual manner, on a touch screen of the mobile terminal;
    a pressure on a button of the mobile terminal;
    a predefined impact movement on the mobile terminal detected by an accelerometer integrated into the mobile terminal;
    a predefined movement of displacement of the mobile terminal detected by an accelerometer integrated into the mobile terminal; and
    an action of unlocking the mobile terminal in order to make it exit a standby mode.

6. The secure access control method according to claim 1, wherein the establishing the second radiocommunication in the second radiocommunication channel inhibits the first radiocommunication in the first radiocommunication channel.

7. The secure access control method according to claim 1, wherein the first radiocommunication chip of the mobile terminal and the first radiocommunication module of the reader operate according to a medium or long-range wireless communication protocol with the first range greater than 1 meter.

8. The secure access control method according to claim 7, wherein the first range is between 1 and 30 meters.

9. The secure access control method according to claim 1, wherein the second radiocommunication chip of the mobile terminal and the second radiocommunication module of the reader operate according to a short-range wireless communication protocol with a second range of 50 centimeters at most.

10. The secure access control method according to claim 9, wherein the range is 1 to 15 centimeters.

11. The secure access control method according to claim 9, wherein the short-range wireless communication protocol is a near field communication protocol.

12. The secure access control method according to claim 1, wherein the mobile terminal is a phone terminal.

13. The secure access control method according to claim 1, wherein the reader further comprises at least one complementary access control system selected from at least one of:
- a biometric control device to provide a complementary access control by biometrics;
- an image capture device to provide a complementary access control by facial recognition; and
- a keyboard in order to provide a complementary access control by entering a code.

14. The secure access control method according to claim 1, wherein the reader is a secure access control reader.

15. The secure access control method according to claim 1, wherein the action of access includes the waking up the first radiocommunication chip of the mobile terminal or the first radiocommunication module of the reader to initiate the communication in said first radiocommunication channel between the mobile terminal and the reader and simultaneously certifying a user's intent to access.

16. The secure access control method according to claim 1, wherein the first range of radiocommunication module corresponds to a maximum distance beyond which the first radiocommunication chip of the mobile terminal cannot establish the first radiocommunication channel.

* * * * *